(12) United States Patent
Lee et al.

(10) Patent No.: US 11,568,654 B2
(45) Date of Patent: Jan. 31, 2023

(54) OBJECT RECOGNITION METHOD AND OBJECT RECOGNITION DEVICE PERFORMING THE SAME

(71) Applicant: SOS LAB CO., LTD, Gwangju (KR)

(72) Inventors: Yong Yi Lee, Seongnam-si (KR); Deok Yun Jang, Gwangju (KR); Jun Hwan Jang, Suwon-si (KR)

(73) Assignee: SOS LAB Co., Ltd., Gwangju (KR)

( * ) Notice: Subject to any disclaimer, the term of this patent is extended or adjusted under 35 U.S.C. 154(b) by 592 days.

(21) Appl. No.: 16/685,827

(22) Filed: Nov. 15, 2019

(65) Prior Publication Data
US 2021/0124960 A1    Apr. 29, 2021

(30) Foreign Application Priority Data
Oct. 28, 2019    (KR) .......................... 10-2019-0134227

(51) Int. Cl.
*G06V 20/59*    (2022.01)
*G06V 10/22*    (2022.01)
(Continued)

(52) U.S. Cl.
CPC ........... *G06V 20/59* (2022.01); *G06K 9/6217* (2013.01); *G06N 3/08* (2013.01); *G06T 5/40* (2013.01);
(Continued)

(58) Field of Classification Search
CPC .............................. G06V 20/59; G06K 9/6217
See application file for complete search history.

(56) References Cited

U.S. PATENT DOCUMENTS

| 11,353,953 B2 * | 6/2022 | Pepperell ................ G06F 3/013 |
| 2006/0222207 A1 | 10/2006 | Balzer et al. |

(Continued)

FOREIGN PATENT DOCUMENTS

| JP | 2012221456 A | 11/2012 |
| JP | 2019100985 A | 6/2019 |

(Continued)

OTHER PUBLICATIONS

Korean Intellectual Property Office, Notice of Office Action, Korean Patent Application No. 10-2019-0134227, dated Dec. 23, 2020, 14 pages.

(Continued)

*Primary Examiner* — Ming Y Hon
(74) *Attorney, Agent, or Firm* — Fenwick & West LLP

(57) ABSTRACT

Provided is an object recognition device for performing object recognition on a field of view (FoV). The object recognition device includes a light detection and ranging (LiDAR) data acquisition module configured to acquire data for the FoV from a sensor configured to project the FoV with a laser and receive reflected light, and a control module configured to perform object recognition on an object of interest in the FoV using an artificial neural network, wherein the control module includes a region of interest extraction module configured to acquire region of interest data based on acquired intensity data for the FoV, and an object recognition module configured to acquire object recognition data using an artificial neural network, and recognize the object of interest for the FoV.

8 Claims, 12 Drawing Sheets

(51) Int. Cl.
*G06V 20/56* (2022.01)
*G06T 5/40* (2006.01)
*G06K 9/62* (2022.01)
*G06N 3/08* (2006.01)
*G06V 10/145* (2022.01)
*G06V 40/10* (2022.01)
*G01S 7/48* (2006.01)

(52) U.S. Cl.
CPC ............ *G06V 10/145* (2022.01); *G06V 10/22* (2022.01); *G06V 20/56* (2022.01); *G06V 40/10* (2022.01); *G01S 7/4802* (2013.01); *G01S 7/4808* (2013.01)

(56) References Cited

U.S. PATENT DOCUMENTS

| | | | | |
|---|---|---|---|---|
| 2018/0357787 | A1* | 12/2018 | Zhou | G06T 5/40 |
| 2018/0376124 | A1* | 12/2018 | Zhou | G02B 27/0101 |
| 2019/0072977 | A1* | 3/2019 | Jeon | G06K 9/6261 |
| 2019/0107627 | A1* | 4/2019 | Tian | G01S 17/06 |
| 2019/0147655 | A1* | 5/2019 | Galera | G06T 15/20 |
| | | | | 345/419 |
| 2019/0317510 | A1* | 10/2019 | Ros Sanchez | G05D 1/0088 |
| 2019/0318177 | A1* | 10/2019 | Steinberg | G01S 17/58 |
| 2020/0141807 | A1* | 5/2020 | Poirier | G01J 5/025 |
| 2020/0193206 | A1* | 6/2020 | Turkelson | G06T 5/009 |
| 2020/0293799 | A1* | 9/2020 | Herman | G06T 7/586 |
| 2020/0379090 | A1* | 12/2020 | Nothern, III | G01S 7/4815 |
| 2020/0379092 | A1* | 12/2020 | Morarity | G01S 7/4817 |
| 2021/0012127 | A1* | 1/2021 | Chen | G06V 10/25 |
| 2021/0092280 | A1* | 3/2021 | Nishimura | H04N 5/23222 |
| 2021/0114627 | A1* | 4/2021 | McCurrie | G06N 3/08 |
| 2021/0201661 | A1* | 7/2021 | Al Jazaery | G08C 17/02 |
| 2022/0171026 | A1* | 6/2022 | Bakish | G01S 7/4817 |

FOREIGN PATENT DOCUMENTS

| | | |
|---|---|---|
| KR | 10-2005-0099623 A | 10/2005 |
| KR | 10-2015-0112325 A | 10/2015 |
| KR | 10-1980697 B1 | 5/2019 |

OTHER PUBLICATIONS

Jang, D. et al., "Deep Convolutional Neural Network for Object Detection in an Intensity Map from the 3D LiDAR," ICROS 2019, May 16, 2019, pp. 1-3 (with English abstract).

Jang, D. et al., "Deep Convolutional Neural Network for Object Detection in an Intensity Map from the 3D LiDAR," ICROS 2019, May 1, 2019, pp. 1-3 (with English abstract).

\* cited by examiner

OBJECT RECOGNITION METHOD AND OBJECT RECOGNITION DEVICE PERFORMING THE SAME

CROSS-REFERENCE TO RELATED APPLICATION

This application claims priority to and the benefit of Republic of Korea Patent Application No. 10-2019-0134227, filed on Oct. 28, 2019, the disclosure of which is incorporated herein by reference in its entirety.

BACKGROUND

1. Field of the Invention

The present disclosure relates to an object recognition method and an object recognition device for performing the same, and more particularly, to an object recognition method for extracting a region of interest using light received by projecting a field of view with light and for recognizing an object of interest in the field of view, and an object recognition device for performing the same.

2. Discussion of Related Art

In the fields of object recognition techniques, accuracy of detecting and tracking objects is required to constantly increase, whereas a time required to recognize an object, that is, an amount of data computation, is required to be relatively reduced. In such a trend, with the performance improvement of devices that recognize objects, techniques for processing data measured by equipment using artificial neural networks have entered the spotlight as next generation object recognition techniques.

In the fields of object recognition techniques, instead of a method of performing object recognition on an entire image, a method of performing object recognition on a region of interest after setting the region of interest of the image, which is estimated to be in an object, is used as a method for reducing an amount of computation. In particular, in the field of light detection and ranging or laser imaging, detection, and ranging (LiDAR), a multi-modal type method of recognizing an object from a LiDAR image for a corresponding region of interest after extracting the region of interest using an image acquired by a visible light camera is mainly used.

However, the conventional multi-modal object recognition using a plurality of devices has a limitation in that efficiency or performance of the object recognition is dependent on performance of any one device, such as the case in which synchronization or calibration between the devices is needed or the case in which performance of a specific device such as a red-green-blue (RGB) camera is reduced in an environment in which an object has a low level of illuminance, such as at night or in bad weather.

SUMMARY OF THE INVENTION

The present disclosure is directed to providing an object recognition method for recognizing an object of interest by extracting data for a field of view using a light detection and ranging or laser imaging, detection, and ranging (LiDAR) device that uses light, and an object recognition device for performing the same.

The present disclosure is also directed to providing an object recognition method for extracting a region of interest from a field of view using a single sensor and recognizing an object of interest, and an object recognition device for performing the same.

The present disclosure is also directed to providing an object recognition method for setting a region of interest for a field of view using a LiDAR device and performing object recognition, and an object recognition device for performing the same.

The present disclosure is also directed to providing an object recognition method for performing object recognition using only data corresponding to a region of interest from data measured by a LiDAR device, and an object recognition device for performing the same.

The scope of the present disclosure is not limited to the above-described objects, and other unmentioned objects may be clearly understood by those skilled in the art from this specification and the accompanying drawings.

According to an aspect of the present disclosure, there is provided an object recognition device for performing object recognition on a field of view (FoV), which includes a LiDAR data acquisition module configured to acquire data for the FoV including time of flight (ToF) data for a plurality of points within the FoV and a plurality of point intensity data from a sensor which receives reflected light by projecting the FoV with a laser, and a control module configured to perform object recognition on an object of interest in the FoV using at least one artificial neural network, wherein the control module includes a region of interest extraction module configured to acquire intensity data for the FoV based on the plurality of point intensity data and acquire region of interest data indicating a region of interest in the FoV from the intensity data using a first artificial neural network which is trained to receive first input data and generate data indicating a set of data satisfying a predetermined condition from the first input data, and an object recognition module configured to acquire distance data for the FoV based on the ToF data, acquire data of interest from the distance data based on the region of interest data, acquire object recognition data from the data of interest such that an object of interest in the FoV is recognized, by using a second artificial neural network which is trained to receive second input data and perform object recognition on the second input data.

According to another aspect of the present disclosure, there is provided an object recognition method in which an object of interest in a field of view (FoV) is recognized by acquiring time of flight (ToF) data from a sensor configured to receive reflected light by projecting the FoV with a laser, wherein the ToF data is based on a time point at which the laser is projected and a time point at which the reflected light is received, which includes acquiring distance data corresponding to the FoV based on the ToF data, acquiring intensity data for the FoV based on intensity of the reflected light, acquiring region of interest data indicating a region of interest in the FoV from the intensity data using a first artificial neural network which is trained to receive first input data and generate data indicating a set of data satisfying a predetermined condition from the first input data, acquiring data of interest from the distance data based on the region of interest data, and recognizing the object of interest for the FoV by acquiring object recognition data from the data of interest using a second artificial neural network which is trained to receive second input data and perform object recognition on the second input data.

According to still another aspect of the present disclosure, there is provided an object recognition method in which an object of interest in a field of view (FoV) is recognized by acquiring time of flight (ToF) data for a plurality of points within the FoV and a plurality of point intensity data from a sensor configured to receive the reflected light by projecting the FoV with a laser, which includes acquiring point cloud data which corresponds to points distributed in the FoV and includes distance data based on the ToF data and intensity data based on the plurality of point intensity data, acquiring an intensity image for the FoV based on the intensity data of the point cloud data, inputting the intensity image to a first artificial neural network in the form of a region proposal network, which is trained to receive a first image and output data indicating a region of interest in the first image, and acquiring region of interest data indicating a region of interest in the FoV, acquiring an image corresponding to the region of interest based on the distance data of the points located in the region of interest based on the region of interest data, and recognizing the object of interest in the FoV as inputting the image corresponding to the region of interest to a second artificial neural network which is trained to receive a second image and perform object recognition on the second image.

Solutions for solving the problems of the present disclosure are not limited to the above-described solutions, and other unmentioned solutions may be clearly understood by those skilled in the art from this specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
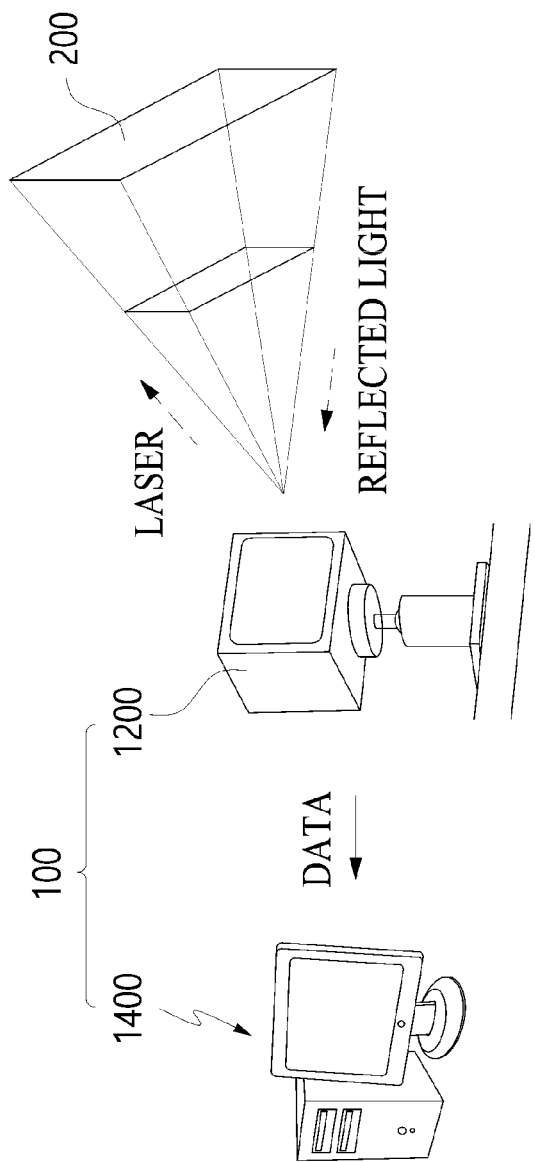
FIG. 1 is a diagram illustrating an object recognition system according to an embodiment of the present disclosure.

The above-described objects, features, and advantages of the present disclosure will be clear from the following detailed descriptions in connection with the accompanying drawings. However, while the present disclosure is susceptible to various modifications and alternative forms, specific embodiments thereof are shown by way of example in the drawings and will be described in detail herein.

The embodiments described herein are intended to clearly explain the spirit of the present disclosure to those skilled in the art to which the present disclosure pertains. Therefore, the present disclosure is not limited to the embodiments described herein, and the scope of the present disclosure should be construed as including modifications or variations without departing from the spirit of the present disclosure.

The drawings attached to this specification are for easily explaining the present disclosure, and the shapes shown in the drawings may be exaggerated and displayed as necessary to help the understanding of the present disclosure, and thus the present disclosure is not limited to the drawings.

When it is determined that detailed descriptions or configurations of related well-known functions may unnecessarily obscure the gist of the present disclosure, the detailed descriptions thereof will be omitted. Numbers (for example, first, second, etc.) used in the description of the specification are used only to identify one element from another element.

A suffix of "unit," "module," or "part" of an element used herein is assigned or incorporated for convenience of specification description, and the suffix itself does not have a distinguished meaning or function.

According to an aspect of the present disclosure, there is provided an object recognition device for performing object recognition on a field of view (FoV), which includes a LiDAR data acquisition module configured to acquire data for the FoV including time of flight (ToF) data for a plurality of points within the FoV and a plurality of point intensity data from a sensor which receives reflected light by projecting the FoV with a laser, and a control module configured to perform object recognition on an object of interest in the FoV using at least one artificial neural network, wherein the control module includes a region of interest extraction module configured to acquire intensity data for the FoV based on the plurality of point intensity data and acquire region of interest data indicating a region of interest in the FoV from the intensity data using a first artificial neural network which is trained to receive first input data and generate data indicating a set of data satisfying a predetermined condition from the first input data, and an object recognition module configured to acquire distance data for the FoV based on the ToF data, acquire data of interest from the distance data based on the region of interest data, acquire object recognition data from the data of interest such that an object of interest in the FoV is recognized, by using a second artificial neural network which is trained to receive second input data and perform object recognition on the second input data.

Here, the control module may process the intensity data based on the distance data and input the processed intensity data to the first ANN to acquire the ROI data.

Here, the processed intensity data may be processed based on an albedo of an object included in the FoV.

Here, each of the first ANN and the second ANN may include at least one of a deep neural network (DNN), a convolutional neural network (CNN), regions with a CNN (R-CNN), a fast R-CNN, a faster R-CNN, you only look once (YOLO), and a single shot multi-box detector (SSD).

Here, the control module may perform histogram equalization and upsampling on the intensity data.

Here, the object of interest includes a vehicle, a pedestrian, and a building and the object recognition data indicates correspondence between at least one of the vehicle, the pedestrian, and the building and the object of interest.

Here, the FoV may include at least a portion in a vehicle, the object of interest may include at least a portion of a user's body in the vehicle, and the control module may recognize at least a portion of the user's body to perform a predetermined function in the vehicle.

Here, the object recognition device may include a display configured to display an image corresponding to the FoV, and the control module may output an image in which the ROI is displayed on the image through the display based on the ROI data.

According to another aspect of the present disclosure, there is provided an object recognition method in which an object of interest in a field of view (FoV) is recognized by acquiring time of flight (ToF) data from a sensor configured to receive reflected light by projecting the FoV with a laser, wherein the ToF data is based on a time point at which the laser is projected and a time point at which the reflected light is received, which includes acquiring distance data corresponding to the FoV based on the ToF data, acquiring intensity data for the FoV based on intensity of the reflected light, acquiring region of interest data indicating a region of interest in the FoV from the intensity data using a first artificial neural network which is trained to receive first input data and generate data indicating a set of data satisfying a predetermined condition from the first input data, acquiring data of interest from the distance data based on the region of interest data, and recognizing the object of interest for the FoV by acquiring object recognition data from the data of interest using a second artificial neural network which is trained to receive second input data and perform object recognition on the second input data.

According to still another aspect of the present disclosure, there is provided an object recognition method in which an object of interest in a field of view (FoV) is recognized by acquiring time of flight (ToF) data for a plurality of points within the FoV and a plurality of point intensity data from a sensor configured to receive the reflected light by projecting the FoV with a laser, which includes acquiring point cloud data which corresponds to points distributed in the FoV and includes distance data based on the ToF data and intensity data based on the plurality of point intensity data, acquiring an intensity image for the FoV based on the intensity data of the point cloud data, inputting the intensity image to a first artificial neural network in the form of a region proposal network, which is trained to receive a first image and output data indicating a region of interest in the first image, and acquiring region of interest data indicating a region of interest in the FoV, acquiring an image corresponding to the region of interest based on the distance data of the points located in the region of interest based on the region of interest data, and recognizing the object of interest in the FoV as inputting the image corresponding to the region of interest to a second artificial neural network which is trained to receive a second image and perform object recognition on the second image.

The present disclosure relates to an object recognition method and an object recognition device for performing the same. Specifically, according to an embodiment of the present disclosure, an object recognition method in which an object of interest is recognized through a ROI suggested in a FoV using a LiDAR, and a device for performing the same may be provided.

Here, the LiDAR is a technique for detecting distance, direction, speed, temperature, material distribution, and concentration characteristics by projecting a FoV with a laser to measure time taken to receive reflected light and an intensity of the light.

Here, the FoV may be a target region in which data is desired to be acquired using the LiDAR technique and may refer to a virtual plane or a virtual space to which a laser is emitted from a LiDAR device.

Here, the ROI may refer to a partial region selected within the FoV in order to reduce an analysis target in image analysis and video analysis.

Here, the object of interest may refer to a target of object recognition present in the FoV. However, the object of interest may include an object to be recognized itself using the LiDAR technique as well as the target of the object recognition present in the FoV.

Here, the object recognition is a technique in which image or video data for a target object is processed and is a concept encompassing object detection, object recognition, object sensing, object tracking, object classification, object segmentation, object identification, and the like. In this specification, the object recognition may be replaced with at least one of the terms listed above or may be used interchangeably with at least one of the terms listed above according to the purpose of object recognition.

Meanwhile, hereinafter, in the description of an object recognition system according to an embodiment of the present disclosure, the method of using the LiDAR device is mainly described, but the spirit of the present disclosure is not limited thereto. In place of the LiDAR device, devices that can be used for object recognition, such as a radio detection and ranging (RaDAR) device, a red-green-blue (RGB) camera, and the like, may be used.

Hereinafter, an object recognition system 100 according to an embodiment of the present disclosure will be described with reference to FIG. 1.

FIG. 1 is a diagram illustrating the object recognition system 100 according to the embodiment of the present disclosure.

Referring to FIG. 1, the object recognition system 100 may include a LiDAR unit 1200 and an analysis unit 1400. In the object recognition system 100, the LiDAR unit 1200 may project a FoV 200 with a laser to acquire data on the basis of reflected light, and the analysis unit 1400 may perform object recognition on the FoV 200 on the basis of the data acquired by the LiDAR unit 1200.

The LiDAR unit 1200 may project the FoV 200 with the laser and receive the reflected light. In this case, the LiDAR unit 1200 may generate data for the FoV 200 on the basis of an intensity of the projected light, reflected light, and received light.

Specifically, according to the embodiment of the present disclosure, the LiDAR unit 1200 may project the FoV 200 with light by a light projection module (not illustrated) to receive the reflected light using a light reception module (not illustrated) and may provide the data based on the received reflected light to the analysis unit 1400 by a LiDAR control module (not illustrated) and a LiDAR communication module (not illustrated).

Here, the data for the FoV 200 may include ToF data, distance data, depth data, intensity data, and the like. The data for the FoV 200 will be described below in detail.

The LiDAR unit 1200 may communicate with the analysis unit 1400 in a wired and/or wireless manner. The LiDAR unit 1200 may provide the data for the FoV 200 to the analysis unit 1400.

The analysis unit 1400 may perform object recognition on the FoV 200. Specifically, the analysis unit 1400 may perform the object recognition on the FoV 200 on the basis of the data for the FoV 200 received from the LiDAR unit 1200.

The analysis unit 1400 may include a communication module (not illustrated), a memory (not illustrated), an input module (not illustrated), an output module (not illustrated), and a control module (not illustrated).

The communication module may perform communication with an external device. The analysis unit 1400 may transmit or receive the data to or from the LiDAR unit 1200 or an external server through the communication module. Here, the communication module may include a wired and/or wireless manner.

Various pieces of information may be stored in the memory. An operation program for driving the analysis unit 1400, a program for operating each component of the analysis unit 1400, and various types of pieces of data necessary for an operation of the analysis unit 1400 may be temporarily or semi-permanently stored in the memory. For example, a program for processing the data for the FoV 200 and an ANN for analyzing the data may be stored in the memory. The memory may be provided in the form of being embedded in the analysis unit 1400 or in the form of being detachable.

The input module may receive a user input from a user. The user input may be in various forms including key input, touch input, and voice input. The input module is a comprehensive concept that includes all of a conventional keyboard, keypad, and mouse, a touch sensor for detecting a user's touch, and various types of input devices for detecting and receiving various types of user inputs.

The output module may output and provide various types of pieces of information to the user. The output module is a comprehensive concept that includes all of a display for outputting an image, a speaker for outputting sound, a haptic device for generating vibrations, and various types of other output devices.

The control module may control an overall operation of the analysis unit 1400. For example, the control module may load a program for processing and analyzing data from the memory to process and analyze the data acquired from the LiDAR unit 1200 and may generate a control signal such that a result is provided to the user through the output module.

The analysis unit 1400 may have a separate power supply, receive power from the outside in a wired and/or wires manner, or have a separate switch for controlling a power supply.

The analysis unit 1400 may use techniques, such as big data, machine learning model, artificial intelligence, or an ANN, in order to perform object recognition. For example, the analysis unit 1400 may drive a machine-learned program to perform the object recognition on the FoV 200. Examples in which object recognition is performed in the analysis unit 1400 will be described below in more detail.

The object recognition system 100 described above may be physically provided as a single device or a plurality of devices.

For example, the LiDAR unit 1200 and the analysis unit 1400 may be provided as a single object recognition device in which the LiDAR unit 1200 and the analysis unit 1400 are physically integrated. As another example, the LiDAR unit 1200 and the analysis unit 1400 may be provided as a plurality of separate devices.

In this case, the generation and processing of the data for the FoV 200 and the object recognition of the FoV 200 may be performed in at least one of the LiDAR unit 1200 and the analysis unit 1400. For example, the LiDAR unit 1200 may process the data for the FoV 200 to provide an image or a video for the FoV 200 to the analysis unit 1400, and the analysis unit 1400 may perform object recognition on the FoV 200 using the acquired image or video data. As another example, the LiDAR unit 1200 may perform object recognition by processing or using the data for the FoV 200 and display a result through the analysis unit 1400.

Meanwhile, the object recognition device may be configured as the analysis unit 1400. In this case, the object recognition device may include a control module including a LiDAR data acquisition module, a ROI extraction module, and an object recognition module.

Here, the LiDAR data acquisition module is a module for acquiring the data for the FoV 200 from the LiDAR unit 1200. The LiDAR data acquisition module may be implemented as, for example, the above-described communication module. The LiDAR data acquisition module implemented as the communication module may acquire LiDAR data from the LiDAR unit 1200 by communicating with the LiDAR unit 1200. As another example, the LiDAR data acquisition module may be implemented as the light reception module and the LiDAR control module of the LiDAR unit 1200.

Here, the ROI extraction module and the object recognition module are functionally separated components and may be physically provided as a single control module or may be provided as a plurality of physically separate control modules (CPU, chip, and electronic circuit).

Figure 2:
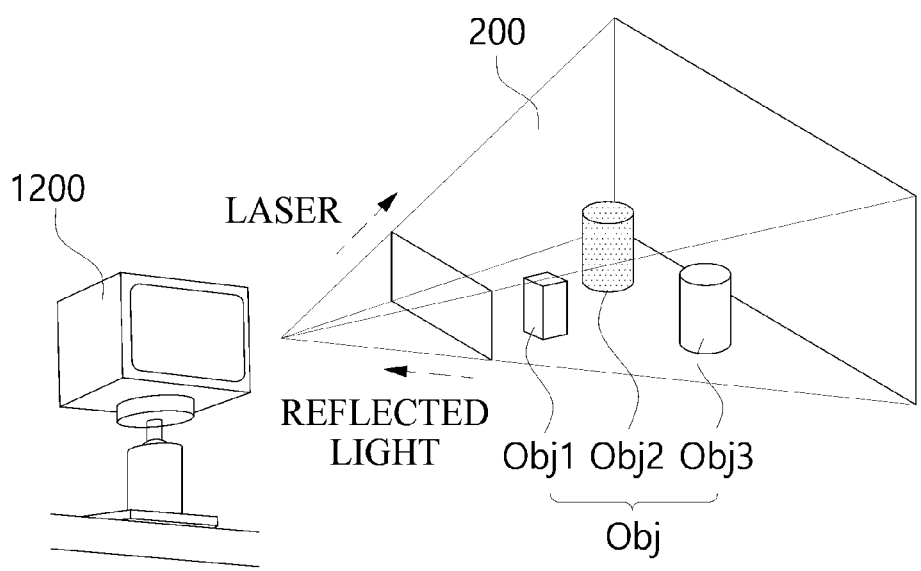
FIGS. 2 and 3 are diagrams of examples of a method of acquiring data for a field of view by a light detection and ranging or laser imaging, detection, and ranging (LiDAR) unit according to an embodiment of the present disclosure.
Figure 3:
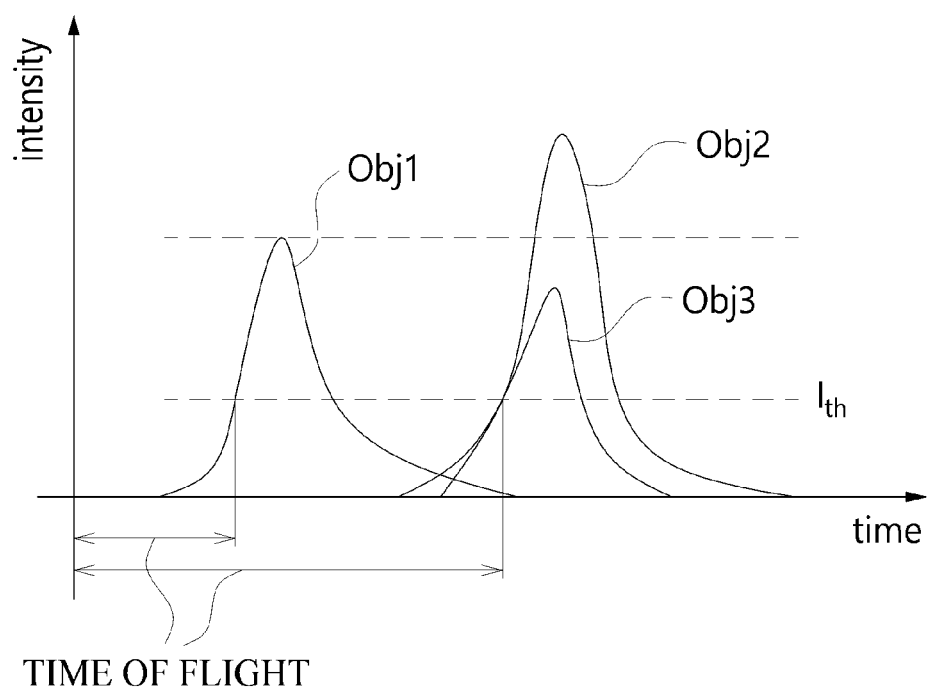

FIGS. 2 and 3 are diagrams of examples of a method of acquiring the data for the FoV 200 by the LiDAR unit 1200 according to the embodiment of the present disclosure.

Referring to FIG. 2, the LiDAR unit 1200 may acquire the data for the FoV 200 by projecting the FoV 200 with a laser and receiving reflected light. Specifically, as illustrated in FIG. 3, the LiDAR unit 1200 may acquire time point information at which the reflected light of the laser applied to the FoV 200 is received and intensity information based on a quantity of light.

Here, the FoV 200 may be formed in various shapes. For example, the FoV 200 may include a virtual plane or a virtual curved surface spaced a predetermined distance from the LiDAR unit 1200. As another example, the FoV 200 may include a virtual space between a plane spaced a first distance from the LiDAR unit 1200 and a plane spaced a second distance from the LiDAR unit 1200. As another example, the FoV 200 may include any plane or space defined by a predetermined horizontal angle, a predetermined vertical angle, and a separation distance from the LiDAR unit 1200.

Meanwhile, referring to FIG. 2 again, the FoV 200 may include an object Obj. Here, the object Obj may be an object present in the FoV 200 and may reflect the light emitted from the LiDAR unit 1200. For example, the object Obj may include invisible materials such as liquid and gas molecules as well as visible objects such as people, trees, vehicles, buildings, etc., and may include a target of object recognition performed in the object recognition system 100.

Hereinafter, the method in which the LiDAR unit 1200 acquires the data for the FoV 200 will be described.

The LiDAR unit 1200 may project the FoV 200 with light and acquire distance data using a ToF of the light on the basis of the received reflected light. Specifically, referring to FIGS. 2 and 3, when the LiDAR unit 1200 projects the FoV 200 with light, the projected light may be reflected by the object Obj located in the FoV 200 and provided to the LiDAR unit 1200, and the LiDAR unit 1200 may generate ToF data by calculating the ToF of the light on the basis of a time point at which the light is emitted and a time point at which the reflected light is received. Here, referring to FIG. 3 again, when the intensity of the reflected light is greater than an intensity threshold value Ith, the LiDAR unit 1200 may recognize that the reflected light is received and calculate the ToF on the basis of a time point at which the intensity of the reflected light is greater than the intensity threshold value Ith. Therefore, in order to calculate a more accurate reflected light reception time point, the LiDAR unit 1200 may calculate the reflected light reception time point earlier than the measured time point or may reduce the intensity threshold value Ith for the LiDAR unit 1200 to recognize that the reflected light is received.

Meanwhile, the LiDAR unit 1200 may acquire the distance data using a frequency modulated continuous wave (FMCW) method or a phase shift method. Here, the FMCW method may refer to a method in which the LiDAR unit 1200 acquires distance data by changing a frequency of light emitted to the FoV 200 and measuring a frequency difference of the received reflected light. Here, the phase shift method may refer to a method in which the LiDAR unit 1200 continuously projects the FoV 200 with light having a predetermined frequency and measures a phase change amount of the received reflected light to obtain distance data.

The LiDAR unit 1200 may calculate distance data or depth data for the FoV 200 using the ToF data or may generate a two-dimensional (2D) image, a three-dimensional (3D) image, or a video corresponding to the FoV 200. Specifically, the LiDAR unit 1200 may generate a point cloud image or a depth map, which is a collection of pieces of data indicating a distance or depth of the points constituting the FoV 200, using the ToF data.

The LiDAR unit 1200 may acquire intensity data on the basis of amount or quantity of the reflected light. Specifically, the LiDAR unit 1200 may acquire the intensity data for the reflected light as well as the reception time point of the light reflected by the object Obj. Here, the intensity data may be measured differently even at the same distance according to a degree of the light reflected by the object Obj. For example, referring to FIGS. 2 and 3 again, a second object Obj2 and a third object Obj3 may be spaced the same distance from the LiDAR unit 1200, but an intensity of the light reflected by the second object Obj2 may be greater than an intensity of the light reflected by the third object Obj3. As another example, a first object Obj1 may be located at a shorter distance from the LiDAR unit 1200 than the second object Obj2, but an intensity of the light reflected by the second object Obj2 may be greater than the intensity of the light reflected by the first object Obj1 due to a difference in intensity.

Meanwhile, the LiDAR unit 1200 may project the FoV 200 with light, provide pieces of data to the analysis unit 1400 on the basis of the received reflected light without processing the data, and process the data provided as necessary in the analysis unit 1400, or may process the pieces of data for the FoV 200 to provide the data to the analysis unit 1400.

Hereinafter, a method in which the analysis unit 1400 performs object recognition on the basis of the data for the FoV 200 measured in the LiDAR unit 1200 will be described with reference to FIGS. 4 to 9.

Figure 4:
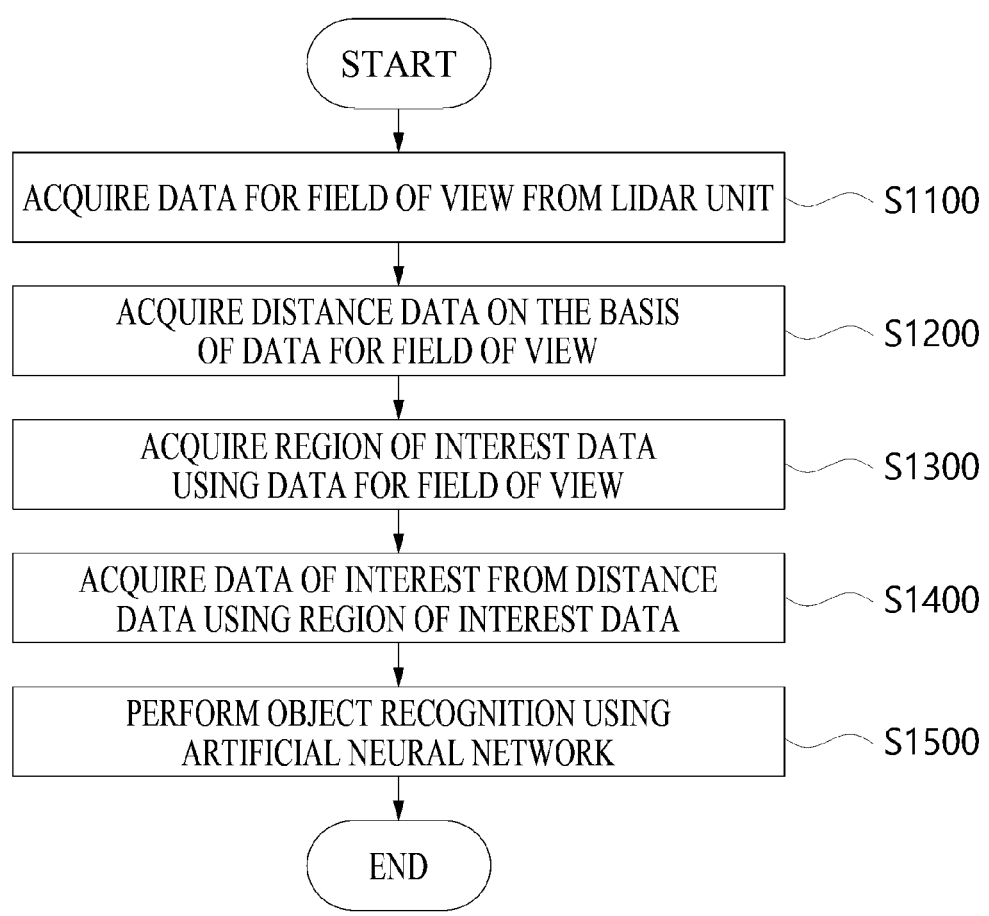
FIG. 4 is a flowchart of an object recognition method according to an embodiment of the present disclosure.

FIG. 4 is a flowchart of an object recognition method according to an embodiment of the present disclosure. An analysis unit 1400 according to the embodiment of the present disclosure may perform object recognition on a FoV 200 using data acquired by a LiDAR unit 1200.

Referring to FIG. 4, the object recognition method may include acquiring, by the analysis unit 1400, data for the FoV 200 from the LiDAR unit 1200 (S1100), acquiring distance data using the data for the FoV 200 (S1200), acquiring data of interest from the distance data using ROI data (S1300), and performing object recognition using an ANN (S1400).

Hereinafter, the above-described operations will be described in more detail.

The analysis unit 1400 may acquire the data for the FoV 200 from the LiDAR unit 1200 (S1100). Here, the data for the FoV 200 may include data for reflected light received by the LiDAR unit 1200 from the FoV 200 or data obtained by processing the data for the reflected light in the LiDAR unit 1200. For example, the data for the FoV 200 acquired by the analysis unit 1400 may include ToF data, distance data, depth data, intensity data, and at least one of point cloud data corresponding to the FoV 200 and image data. Here, the point cloud data may refer to data including distance data for each of points forming the FoV 200 or data including distance data and intensity data for each of points forming the FoV 200.

Here, intensity data may be used as a meaning of intensity data for the FoV 200 or a meaning of a plurality of point intensity data corresponding to amount of reflected light for each point within the FoV 200. Moreover, intensity data may also be used as a meaning of a group of the plurality of point intensity data.

The analysis unit 1400 may acquire the distance data using the data for the FoV 200 (S1200). Here, the distance data may be data based on the ToF for the FoV 200 and may be displayed as a 2D or 3D image corresponding to the FoV 200. Meanwhile, in order to perform object recognition in the analysis unit 1400, the depth data or data representing information about an object in the FoV 200 may be used in addition to the distance data. In addition, when the data measured for the FoV 200 is processed by the LiDAR unit 1200 to generate and provide the distance data to the analysis unit 1400, the present operation may be omitted.

The analysis unit 1400 may acquire the ROI data from the data for the FoV 200 (S1300).

Here, the ROI data may include data indicating the ROI in the FoV 200. For example, the ROI data may include coordinate values indicating the ROI in the FoV 200 formed to include at least a portion of the distance data.

The analysis unit 1400 may suggest a region in which object recognition is to be performed in the FoV 200 by acquiring the ROI data. A method of acquiring the ROI data from the FoV 200 will be described below in detail.

The analysis unit 1400 may acquire the data of interest from the distance data using the ROI data (S1400). Here, the data of interest may refer to data for the ROI on which object recognition is to be performed in the object recognition system 100. Alternatively, the data of interest may refer to data used as input data of an ANN for object recognition, which is described below. For example, the analysis unit 1400 may select the distance data belonging to the ROI indicated by the ROI data, in the FoV 200, as object recognition target data.

The analysis unit 1400 may perform the object recognition using the ANN (S1400). Specifically, a representative example of the ANN includes a deep learning ANN including an input layer which receives data, an output layer which outputs a result, and a hidden layer which processes data between the input layer and the output layer. Detailed examples of the ANN include a CNN, a recurrent neural network (RNN), a DNN, and the like. In this specification, the ANN should be interpreted in a comprehensive sense including all of the above-described ANNs, various other types of ANNs, or combinations thereof, and does not necessarily have to be a deep learning ANN.

For example, the analysis unit 1400 may perform object of interest recognition on the FoV 200 by acquiring object recognition data from the data of interest using an ANN which is trained to receive the input data and perform object recognition on the input data.

Meanwhile, the analysis unit 1400 may include a k-nearest neighbors algorithm (k-NN), random forest, support vector machines (SVM), principal component analysis (PCA), etc. in addition to the ANN model. The analysis unit 1400 may include all of ensemble forms or other forms combined in various ways. Meanwhile, in the embodiments mentioned around the ANN, it is noted that the ANN may be replaced by another machine learning model unless otherwise mentioned.

Figure 5:
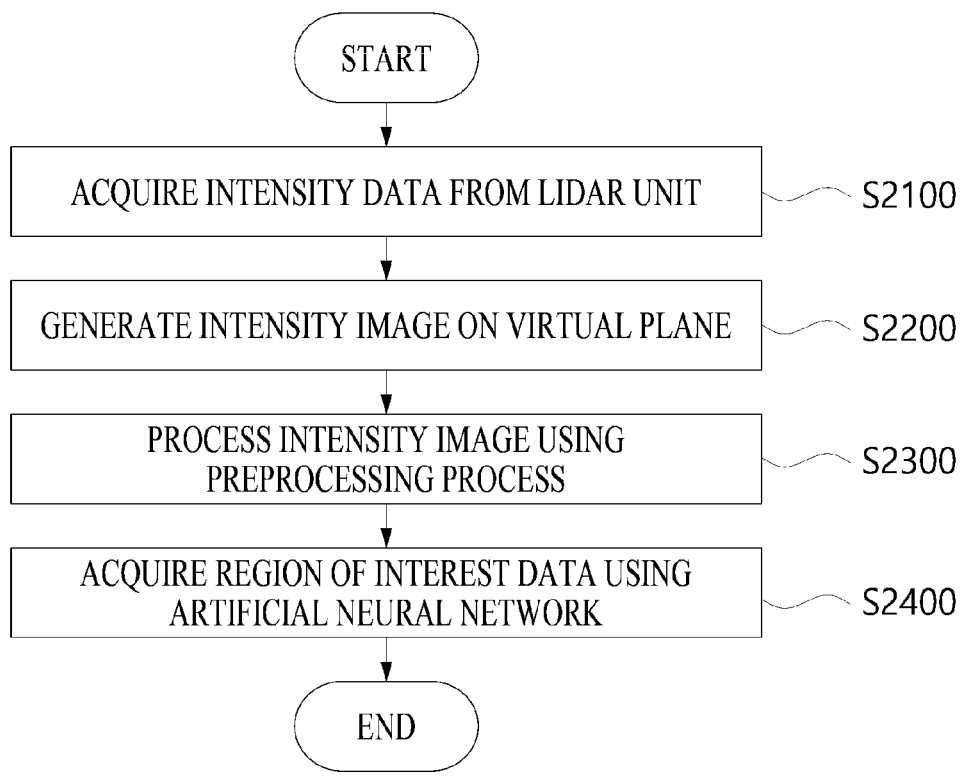
FIG. 5 is a flowchart of a method of extracting a region of interest in a field of view according to an embodiment of the present disclosure.

FIG. 5 is a flowchart of a method of extracting the ROI in the FoV 200 according to the embodiment of the present disclosure.

Referring to FIG. 5, the method of extracting the ROI may include acquiring, by the analysis unit 1400, intensity data from the LiDAR unit 1200 (S2100), generating an intensity image on a virtual plane (S2200), processing the intensity image using a preprocessing process (S2300), and acquiring ROI data using an ANN (S2400).

Hereinafter, the above-described operations will be described in more detail.

The analysis unit 1400 may acquire the intensity data from the LiDAR unit 1200 (S2100). The intensity data may refer to data based on an intensity of reflected light with respect to the FoV 200 received by the LiDAR unit 1200. Since the intensity data is based on the light reflected by an object Obj in the FoV 200, the intensity data may include information about a position at which the light is reflected. For example, the intensity data may include spatial coordinates of the object Obj which reflect the light in the FoV 200 and an intensity value of the reflected light.

The analysis unit 1400 may generate an intensity image on a virtual plane (S2200). Specifically, the analysis unit 1400 may generate an intensity image (an intensity map) for the FoV 200 on the basis of the intensity data. Here, the intensity image may be displayed as a 2D image or a 3D image. For example, the intensity image may include a 2D image generated by projecting the intensity data for the FoV 200 onto the virtual plane spaced a predetermined distance from the LiDAR unit 1200. As another example, the intensity image may include a 3D image corresponding to the FoV 200 generated using the intensity data for the FoV 200 or a 3D image corresponding to a virtual space which is spaced or not spaced a predetermined distance from the LiDAR unit 1200.

Here, the intensity data or the intensity image may include a distance at which the object Obj is spaced from the LiDAR unit 1200, and at least one of a position, state, and characteristic of the object Obj, such as a reflectance or an albedo of the object Obj. For example, the intensity data may include a reflectance of the object Obj. In this specification, the intensity data may generally directly reflect an intensity value of the received light, but the present disclosure is not limited thereto. For example, reflectance or material may be used to detect the ROI from the intensity data. In this case, a result of correcting the intensity value of the received light using a distance value acquired from the distance data may be used as the intensity data.

Meanwhile, when the LiDAR unit 1200 generates the intensity image on the basis of the intensity data and provides the intensity image to the analysis unit 1400, the acquiring, by a analysis unit 1400, of the intensity data from the LiDAR unit 1200 (S2100), and the generating of the intensity image on the virtual plane (S2200), which are described above, may be omitted.

The analysis unit 1400 may process the intensity image using a preprocessing process (S2300). Specifically, the analysis unit 1400 may change image characteristics, such as brightness, saturation, contrast, resolution, and quality of the intensity image. In the intensity image processed using the preprocessing process, object recognition may be performed more accurately by an ANN described below.

The analysis unit 1400 may change brightness and the like of the intensity image by histogram modification. Here the histogram modification is an image processing technique for changing a distribution of pixel values of an image and may include a histogram equalization technique. Meanwhile, the analysis unit 1400 may change brightness and the like of the intensity image using image processing techniques, such as gray-scale modification or image algebra in addition to the histogram modification.

The analysis unit 1400 may increase a resolution of the intensity image using an upsampling technique and thus image quality may be improved. Alternatively, the analysis unit 1400 may increase the resolution of the intensity image using interpolation.

The analysis unit 1400 may acquire ROI data using an ANN (S2400). As a specific example, the analysis unit 1400 may acquire the ROI data using at least one ANN of a CNN, an R-CNN, a fast R-CNN, a faster R-CNN, YOLO, and a SSD.

For example, the analysis unit 1400 may acquire the ROI data from the intensity data or the intensity image using the ANN which is trained to receive input data and output data indicating a range of data satisfying a predetermined condition from the input data.

Meanwhile, the ANN used in the present operation may include an ANN used by the analysis unit 1400 in order to perform object recognition, as described above.

Hereinafter, a method of acquiring the ROI data by the analysis unit 1400 according to the embodiment of the present disclosure will be described with reference to FIGS. 6 to 8.

Figure 6:
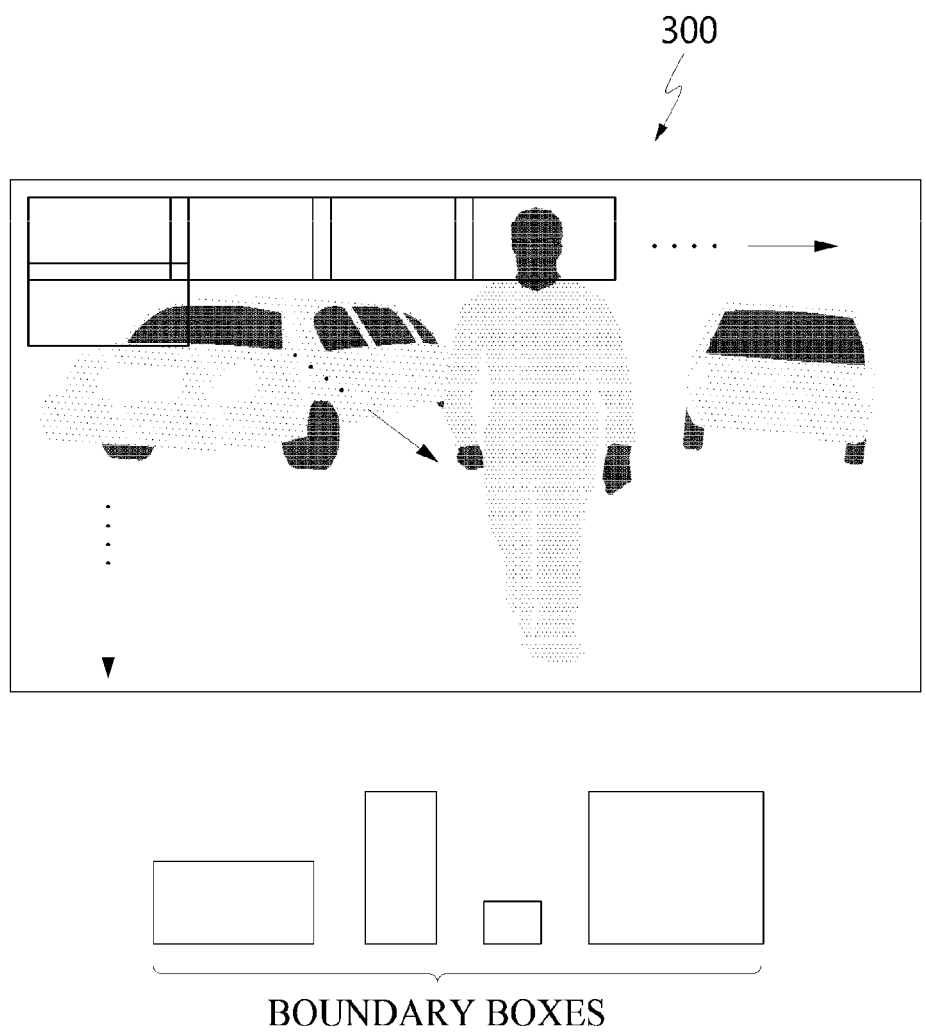
FIGS. 6 and 7 are diagrams of examples of a method of extracting a region of interest in a field of view according to an embodiment of the present disclosure.
Figure 7:
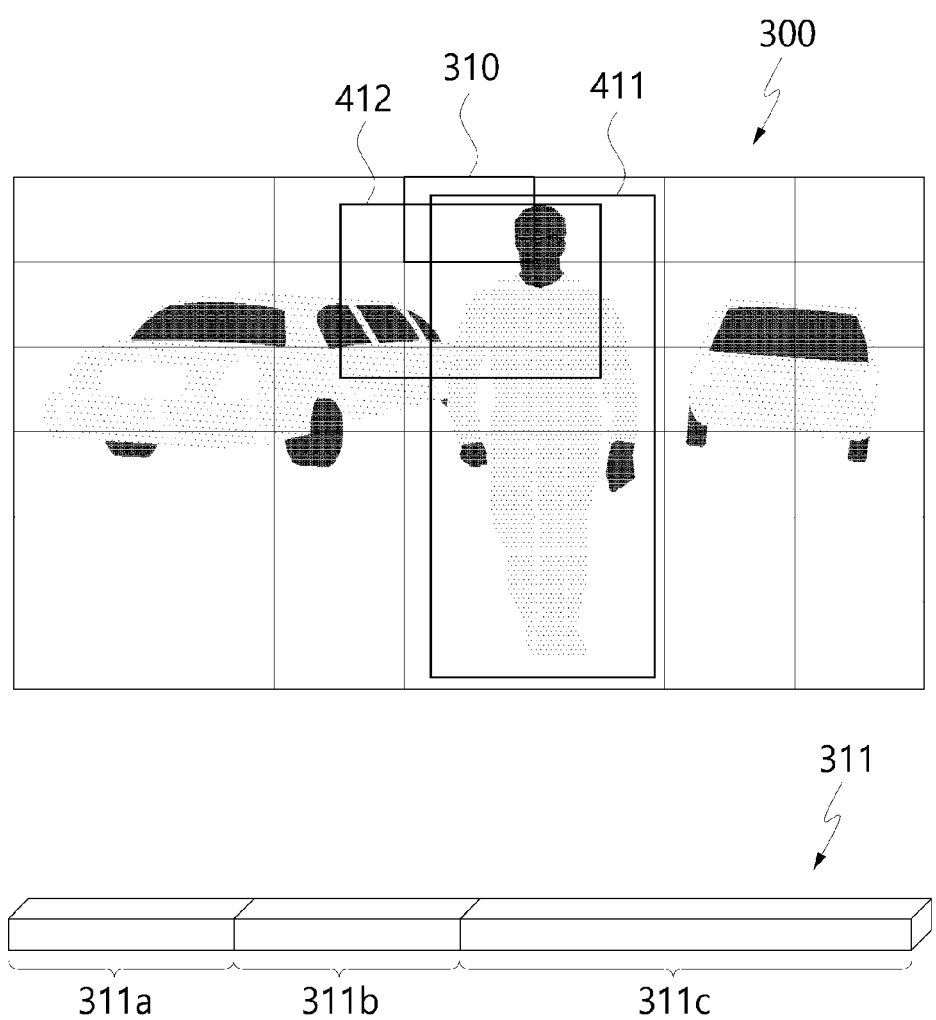

FIGS. 6 and 7 are diagrams of examples of a method of extracting the ROI in the FoV according to the embodiment of the present disclosure.

Referring to FIG. 6, the analysis unit 1400 may extract the ROI from an intensity image 300 using boundary boxes. Specifically, the analysis unit 1400 may scan the intensity image 300 by sliding in a predetermined direction using at least one boundary box, assign a score to the intensity image 300 for each region, and extract a region that is greater than or equal to a predetermined score as the ROI.

Here, the intensity image 300 may be a 2D or 3D image generated based on the intensity data or may include the processed intensity image 300 processed using a preprocessing process. Alternatively, the analysis unit 1400 may extract the ROI using at least one boundary box for a feature map acquired from the intensity image 300 using a CNN instead of the intensity image 300.

Here, the analysis unit 1400 may acquire a score for each region by sliding the boundary box in a horizontal, longitudinal, or diagonal direction with respect to the intensity image 300.

The ANN used by the analysis unit 1400 to obtain the ROI data may include the ANN which is trained to extract the ROI using boundary boxes, as described above.

Referring to FIG. 7, the analysis unit 1400 may extract the ROI from the intensity image 300 using grid cells 310. Specifically, the analysis unit 1400 may divide the intensity image 300 into at least one grid cell 310, set a boundary box in which each of the grid cells 310 is estimated to have at least one object Obj, assign a score to the boundary box, and then acquire a boundary box having a score which is greater than or equal to the predetermined score as the ROI.

Here, the intensity image 300 may be a 2D or 3D image generated based on the intensity data or may include the processed intensity image 300 processed using a preprocessing process. Alternatively, the analysis unit 1400 may extract the ROI using at least one boundary box for the feature map acquired from the intensity image 300 using a CNN instead of the intensity image 300.

More specifically, referring to FIG. 7 again, the analysis unit 1400 may divide the intensity image 300 into grid cells 310 of m×n and set a first boundary box 411 and a second boundary box 412 in each of the grid cells 310. In this case, data for the grid cell 310 may be stored in the form of a data network 311. Here, the data network 311 may include first boundary box data 311a for the first boundary box 411, second boundary box data 311b for the second boundary box 412, and class data 311c for the grid cell 310. Here, the boundary box data may include coordinate and size information of each bounding box as data for the bounding box. Here, the class data 311c may include information about probability that the grid cell 310 may correspond to each class.

As described above, the analysis unit 1400 may extract the ROI in the intensity image 300 or classify the object Obj using the boundary boxes in each of the grid cells 310. In this case, the ANN used by the analysis unit 1400 to obtain the ROI data may include the ANN which is trained to extract the ROI by dividing the intensity image 300 into the grid cells 310, as described above.

Meanwhile, the analysis unit 1400 may of course obtain the ROI data from the intensity image 300 using a region suggestion network other than the above-described method.

Hereinafter, an object recognition method using ROI data according to an embodiment of the present disclosure will be described with reference to FIGS. 8 and 9.

Figure 8:
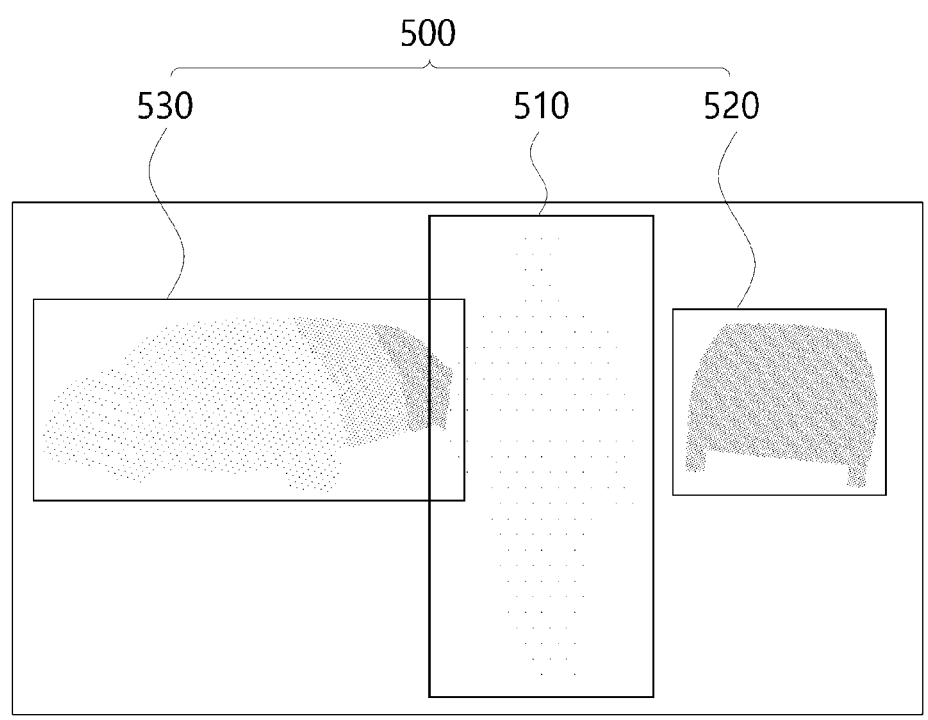
FIG. 8 is a diagram of an example of a method of displaying a region of interest according to an embodiment of the present disclosure.

FIG. 8 is a diagram of an example of a method of displaying a ROI 500 according to an embodiment of the present disclosure.

The analysis unit 1400 may select data of interest from distance data using ROI data acquired using intensity data. Specifically, the analysis unit 1400 may select the data of interest using the ROI data from the distance data acquired by a LiDAR unit 1200. Referring to FIG. 8, the analysis unit 1400 may output the ROI 500 which displays the distance data and the selected data of interest as an image.

Here, the distance data may be displayed as a 2D image or a 3D image.

Here, the ROI 500 may include a region indicating an object of interest in a FoV 200 on the basis of the ROI data and may be displayed as a boundary box or the like in an image of the FoV 200.

Here, the image of the FoV 200 may include a point cloud image, a depth image, a distance image, or the like.

Referring to FIG. 8, the object of interest in the FoV 200 may include a vehicle, a pedestrian, or the like, and may be displayed such that each of first to third ROIs 510, 520, and 530 indicates each object of interest.

Meanwhile, as an example according to the present disclosure, the ROI 500 may be calculated based on the image data obtained by a RGB camera or the ROI data which is measured and acquired by other device other than the LiDAR unit 1200 in addition to the ROI data acquired from the intensity data. In the case of the multi-modal method, since the distance data and the ROI data may include information about different FoVs 200, calibration may be required to extract the data of interest. Specifically, when the distance data and the ROI data are acquired from data measured by different devices, it is necessary to match a format of each piece of data, for example, spatial coordinates or the like. Therefore, when different devices are used to perform object recognition, the analysis unit 1400 may acquire the data of interest after matching data formats such that the devices are mutually compatible.

As another example, when object recognition is performed using one device, that is, in a single-modal method, the above-described calibration operation may be omitted. For example, when the analysis unit 1400 performs object recognition using the distance data, the intensity data, and the like for the same FoV 200 acquired by the LiDAR unit 1200, the analysis unit 1400 may select the data of interest from the distance data for the same FoV 200 using the ROI data acquired from the intensity data for the FoV 200. In this case, the configuration of the object recognition system 100 is simplified and thus the calibration operation is omitted, thereby simplifying a structure or process algorithm of the object recognition system 100. As a result, costs of implementing the object recognition system 100 may be reduced and time required to perform object recognition may be reduced.

As another example, in the single-modal object recognition using one device, the analysis unit 1400 may generate a 2D or 3D image corresponding to the FoV 200 on the basis of the ToF data for the FoV 200 from the LiDAR unit 1200, generate the intensity image 300 on the basis of the intensity data, extract the ROI 500 from the intensity image 300, and perform object recognition on a region corresponding to the above-described ROI 500 extracted from the 2D or 3D image.

Figure 9:
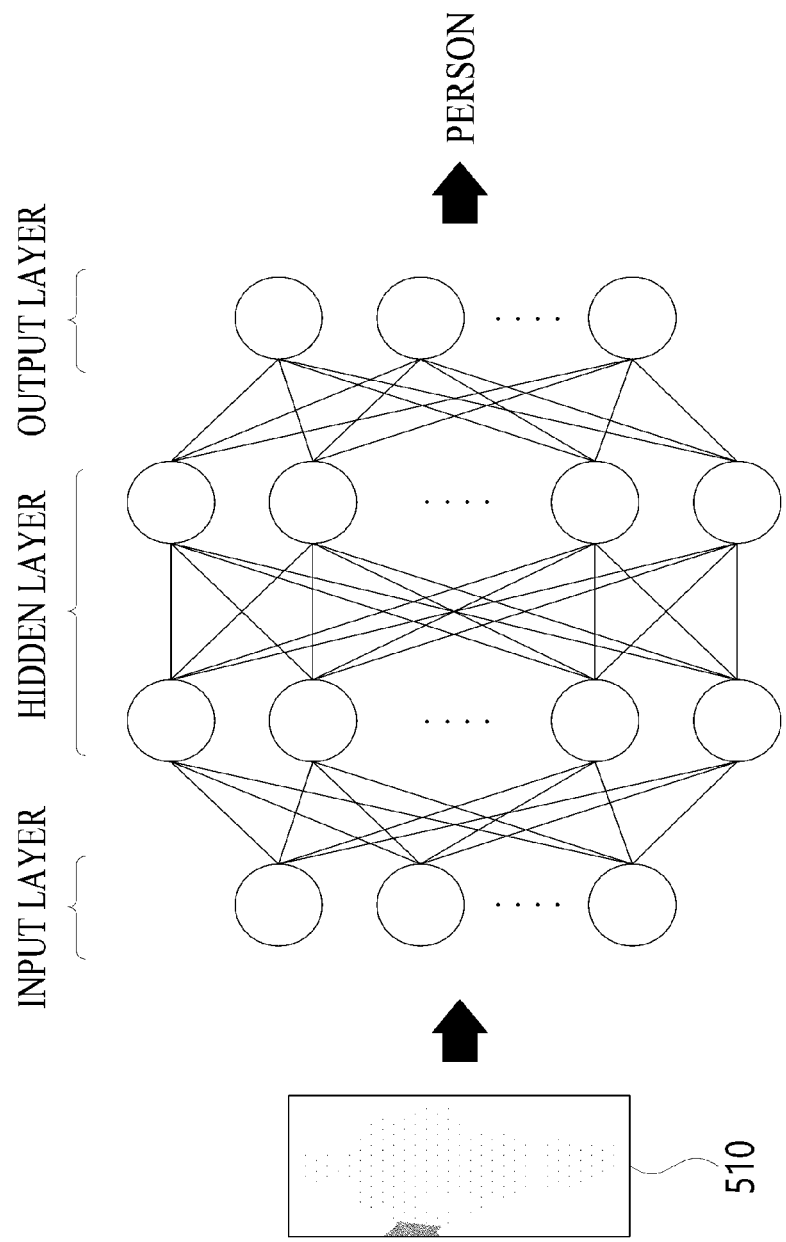
FIG. 9 is a diagram of an example of a method of performing object recognition on an object of interest according to an embodiment of the present disclosure.

FIG. 9 is a diagram of an example of a method of performing object recognition for an object of interest according to an embodiment of the present disclosure.

Referring to FIG. 9, an ANN may include an input layer which receives data of interest selected by the ROI 500, an output layer which outputs an object recognition result, and at least one hidden layer disposed between the input layer and the output layer.

The data of interest may be input to the input layer. The input layer may include a plurality of input nodes. Coordinate information, distance information, and the like of the data of interest may be input to each of the input nodes.

The output layer may output the object recognition result. For example, when the ANN outputs the object recognition result in the form of a binary classification, the output layer may include one or two output nodes. An ANN which outputs a result value in the form of a binary classification may mainly determine whether the object of interest corresponds to a specific type of object.

As another example, when the ANN outputs the object recognition result in the form of a multi classification, the output layer may include a plurality of output nodes. An ANN which outputs a result value in the form of a multi classification may mainly determine whether the object of interest corresponds to a plurality of types of objects.

As still another example, when the ANN outputs the object recognition result in the form of regression, the output layer may include at least one output node.

The ANN may be trained using labeling data tagged with previously recognized object recognition result values and the data of interest as a training data set. Accordingly, the sufficiently trained ANN may output the object recognition result when the data of interest is input.

The analysis unit 1400 may perform object recognition on the ROI 500 using the above-described ANN. Specifically, referring to FIG. 9 again, the analysis unit 1400 may input the data of interest selected by the first ROI 510 to the input layer of the ANN, obtain a probability value that the object of interest selected by the first ROI 510 corresponds to each class through the hidden layer and the output layer of the ANN, and as a result, determine that the object of interest is a person.

The object recognition system 100 described above may be utilized in various technical fields of the modern industry. In particular, when the information about the object included in a captured image or video is required, the object recognition system 100 according to the embodiment of the present disclosure may be used.

As described above, autonomous driving technology is a representative technical field that uses the information of the object present in the FoV 200 obtained by performing the object recognition on the FoV 200.

The object recognition system 100 according to the embodiment of the present disclosure may be mounted on a vehicle to provide information required for autonomous driving to the vehicle. For example, the object recognition system 100 may set a predetermined range from the vehicle as the FoV 200, perform the object recognition on the FoV 200, and provide the object recognition result obtained therefrom to the vehicle, and the vehicle may obtain the object recognition result from the object recognition system 100 and use the object recognition result to perform autonomous driving. Specifically, the LiDAR unit 1200 mounted on the outside of the vehicle may provide the data for the FoV 200 which is acquired by projecting the periphery of the vehicle with light and receiving reflected light to the analysis unit 1400, and the analysis unit 1400 may perform object recognition to obtain information for driving the vehicle, such as a position of a pedestrian, a position of another vehicle, lane information, traffic signal information, and the like, and provide the obtained information to the vehicle.

Meanwhile, the utilization of the object recognition system 100 is not limited to the above-described case but may be utilized on a technical field requiring image or video analysis. For example, as will be described below, the object recognition system 100 may also be used to recognize a gesture of a driver or the like within the vehicle.

Hereinafter, an example of the case in which the object recognition system 100 described above is utilized will be described with reference to FIGS. 10 to 12.

Figure 10:
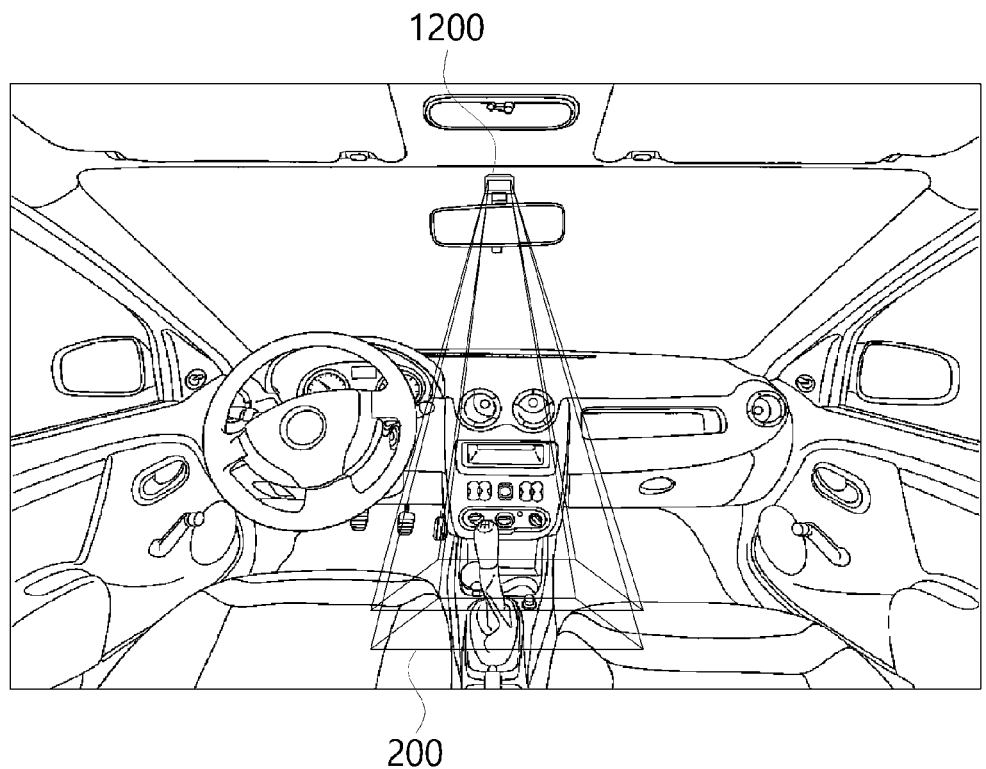
FIG. 10 is a diagram of an example of an object recognition system mounted on a vehicle according to an embodiment of the present disclosure.

FIG. 10 is a diagram of an example of an object recognition system mounted on a vehicle according to an embodiment of the present disclosure. Referring to FIG. 10, the object recognition system 100 may be mounted on a vehicle to perform object recognition on an inner side of the vehicle.

A LiDAR unit 1200 may be mounted inside the vehicle to project a FoV 200 with light. Specifically, the LiDAR unit 1200 may be mounted on a ceiling of the vehicle or a rear view mirror in the vehicle to acquire data for object recognition using the inner side of the vehicle as the FoV 200.

The FoV 200 may be variously set in the vehicle. For example, the FoV 200 may be formed around a gear stick or may be formed in a space between a driver's seat and a passenger seat in the vehicle in order to recognize a gesture of the passenger in the vehicle. As another example, the FoV 200 may be formed around each seat in the vehicle or may be formed for an entire interior of the vehicle.

The LiDAR unit 1200 may provide acquired data for the FoV 200 to the analysis unit 1400 by projecting the FoV 200 in the vehicle with light and receiving reflected light.

The analysis unit 1400 may be mounted in the vehicle but may be omitted when the object recognition is performed by a server outside the vehicle. In this case, the LiDAR unit 1200 may provide the data for the FoV 200 to the server, and the server may perform object recognition on the basis of the data obtained from the LiDAR unit 1200 and provide the data to the vehicle.

Figure 11:
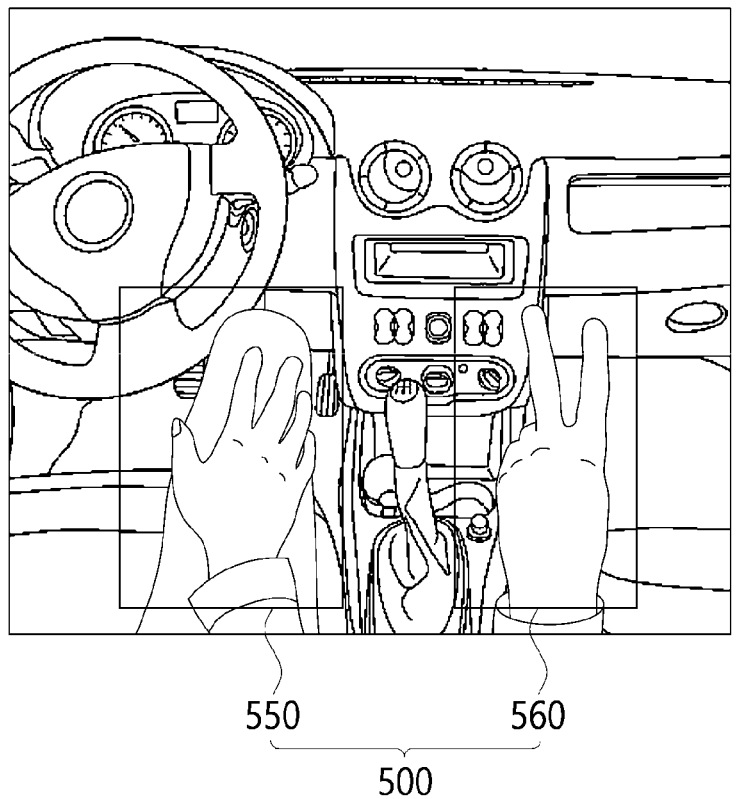
FIG. 11 is a diagram of an example of a method of displaying a region of interest according to an embodiment of the present disclosure.

FIG. 11 is a diagram of an example of a method of displaying a ROI according to the embodiment of the present disclosure.

Referring to FIG. 11, the object recognition system 100 may operate to perform in-vehicle gesture recognition. Here, the FoV 200 may be formed around a space between a driver's seat and a passenger seat, and the object of interest may include hands of people in the driver's seat and the passenger seat.

The analysis unit 1400 may acquire data for the FoV 200 in the vehicle from the LiDAR unit 1200 and perform object recognition. Referring to FIG. 11 again, the analysis unit 1400 may display fifth and sixth ROIs 550 and 560 indicating hands of people in the driver's seat and the passenger seat, respectively, in an image corresponding to the FoV 200 in the vehicle using the ROI data acquired based on the data for the FoV 200.

Figure 12:
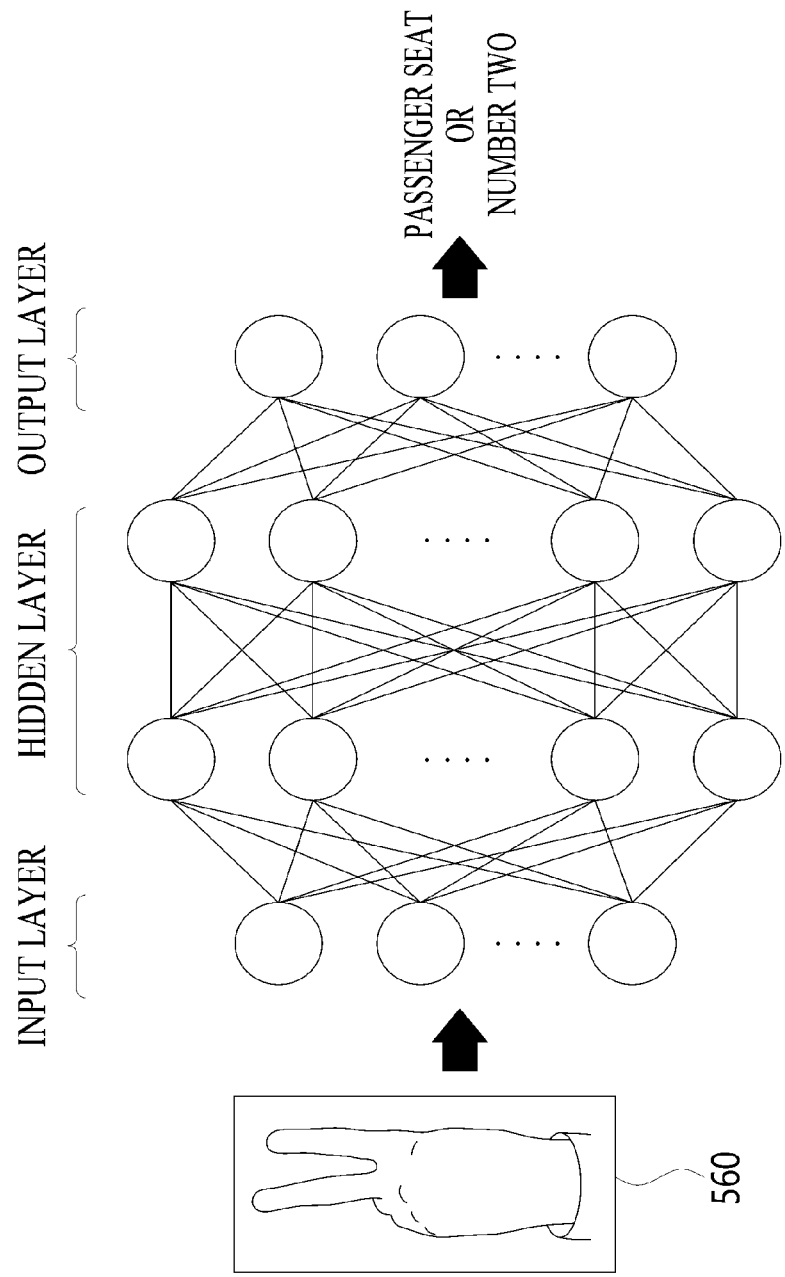
FIG. 12 is a diagram of an example of in-vehicle gesture recognition according to an embodiment of the present disclosure.

FIG. 12 is a diagram of an example of in-vehicle gesture recognition according to the embodiment of the present disclosure.

The analysis unit 1400 may perform object recognition on the ROI 500 indicating the object of interest. Specifically, referring to FIG. 12, the analysis unit 1400 may acquire a result value by inputting the sixth ROI 560 from distance data for the FoV 200 in the vehicle acquired by the LiDAR unit 1200 as input data to an ANN.

Here, the result value obtained by the analysis unit 1400 in the in-vehicle gesture recognition may include a value relating to a type of the object of interest and a type of the gesture of the object of interest. Specifically, referring to FIG. 12 again, the analysis unit 1400 may determine that the object of interest refers to the passenger seat or the number two on the basis of the result value obtained by performing the object recognition on the sixth ROI 560. Alternatively, the analysis unit 1400 may provide the result value or the object recognition data acquired by performing the object recognition to a vehicle control module for controlling the vehicle, and the vehicle control module may control at least one function in the vehicle using the acquired object recognition data.

Meanwhile, the object recognition system 100 according to the embodiment of the present disclosure is not limited to being used for the in-vehicle gesture recognition and may be utilized in various fields that require image processing as well as inside and/or outside the vehicle.

The methods according to the embodiments may be implemented in the form of program instructions that are performable through various computer units and recordable in computer readable media. The computer readable media may include a program instruction, a data file, a data structure, or combinations thereof. The program instruction recorded in the computer readable media may be specially designed and prepared for the embodiments of the invention or may be an available well-known instruction for those skilled in the field of computer software. Examples of the computer readable media include magnetic media such as a hard disk, a floppy disk, and a magnetic tape, optical media such as a compact disk read only memory (CD-ROM) and a digital video disk (DVD), magneto-optical media such as a floptical disk, and a hardware device, such as a read only memory (ROM), a random access memory (RAM), or a flash memory, that is specially made to store and perform the program instruction. Examples of the program instruction may include a machine code generated by a compiler and a high-level language code that can be executed in a computer using an interpreter. Such a hardware device may be configured as at least one software module in order to perform operations of the invention and vice versa.

According to the present disclosure, an object of interest can be extracted and object recognition can be performed even in an environment in which a FoV has a low level of illuminance, such as at night or in bad weather.

According to the present disclosure, since an object recognition system using a single sensor or one device is provided, a configuration of the object recognition system can be simpler than that of using a plurality of sensors or a plurality of devices, and thus costs can be reduced.

Since an object recognition system using a single sensor or one device is provided, it is possible to prevent performance degradation by a specific device unlike the case of using a plurality of sensors or a plurality of devices.

According to the present disclosure, since object recognition is performed using one device, a speed of object recognition can be improved by eliminating a calibration or synchronization process between devices unlike the case of using a plurality of sensors or a plurality of devices.

According to the present disclosure, since object recognition is performed only on selected data of interest by selecting data corresponding to a ROI from data corresponding to a FoV, a time required for the object recognition can be shorter than that in the case in which object recognition is performed on the entire data.

Effects of the present disclosure are not limited to the above-described effects and other unmentioned effects may be clearly understood by those skilled in the art from the following descriptions from this specification and the accompanying drawings.

As described above, while the embodiments have been described with reference to specific embodiments and drawings, various modifications and alterations may be made by those skilled in the art from the above description. For example, when the described technologies are performed in orders different from the described methods, and/or the described components such as a system, a structure, a device and a circuit are coupled or combined in the form different from the described method or replaced or substituted with other components or equivalents, the appropriate result may be achieved.

Therefore, other implementations, other embodiments, and equivalents within the scope of the appended claims are included in the range of the claims to be described.

What is claimed is:

1. An object recognition device for performing object recognition on a field of view (FoV), the object recognition device comprising: a light detection and ranging or laser imaging, detection, and ranging (LiDAR) sensor configured to sense light reflected by a plurality of reflection points which are located in the FoV, and
obtain a plurality of point data based on the sensed lights, each of the plurality of point data corresponding to each of the reflection points, each of the plurality of point data comprising distance data and intensity data, the distance data indicating a distance between the LiDAR sensor and the corresponding reflection point; and
a processor configured to:
obtain an intensity image based on the intensity data of the plurality of point data, wherein the intensity image comprises a plurality of pixels, each of the plurality of pixels corresponding to each of the plurality of point data, and each of the plurality of pixels having an intensity value calculated based on the intensity data of corresponding point data, process, using a first artificial neural network executed by the processor, the intensity image to determine a region of interest in the intensity image, select point data corresponding to the determined region of interest, and process, using a second artificial neural network executed by the processor, the selected point data to obtain an object recognition data related to an object corresponding to the determined region of interest, the object recognition data comprising an object type information indicating a type of the object.

2. The object recognition device of claim 1, wherein the processor is further configured to:
process the intensity data obtained by the LiDAR sensor using the corresponding distance data to obtain corrected intensity data, and
obtain the intensity image based on the corrected intensity data.

3. The object recognition device of claim 1, wherein the processor is further configured to:
process the intensity data obtained by the LiDAR sensor using the corresponding distance data and an albedo of the corresponding reflection point to obtain corrected intensity data, and
obtain the intensity image based on the corrected intensity data.

4. The object recognition device of claim 1, wherein each of the first artificial neural network and the second artificial neural network include at least one of a deep neural network (DNN), a convolutional neural network (CNN), regions with CNN (R-CNN), a fast R-CNN, a faster R-CNN, you only look once (YOLO), and a single shot multi-box detector (SSD).

5. The object recognition device of claim 1, wherein the processor is further configured to process the intensity image by at least one upsampling, interpolation and histogram modification.

6. The object recognition device of claim 1, wherein:
the processor is further configured to recognize whether the object is a vehicle, a pedestrian or a building based on the object type information.

7. The object recognition device of claim 1, wherein:
the plurality of reflection points are parts of objects which are located in the FoV.

8. The object recognition device of claim 1, further comprising a display configured to display an image corresponding to the FoV, wherein the image comprises at least one of an intensity image, a point cloud image and a depth map image, and
wherein the processor is further configured to output the image through the display.

* * * * *